(12) United States Patent
Arrabal et al.

(10) Patent No.: US 9,073,706 B2
(45) Date of Patent: Jul. 7, 2015

(54) ENERGY-EFFICIENT AND RELIABLE OPERATION OF A VACUUM WASTE COLLECTION SYSTEM

(75) Inventors: David Gonzalez Arrabal, Madrid (ES); Niklas Mattias Forestier, Göteborg (SE)

(73) Assignee: Envac AB, Stockholm (SE)

( * ) Notice: Subject to any disclaimer, the term of this patent is extended or adjusted under 35 U.S.C. 154(b) by 387 days.

(21) Appl. No.: 13/805,261

(22) PCT Filed: Jun. 23, 2010

(86) PCT No.: PCT/SE2010/050715
§ 371 (c)(1),
(2), (4) Date: Dec. 18, 2012

(87) PCT Pub. No.: WO2011/162653
PCT Pub. Date: Dec. 29, 2011

(65) Prior Publication Data
US 2013/0089380 A1 Apr. 11, 2013
US 2013/0243536 A9 Sep. 19, 2013

(51) Int. Cl.
*E03B 1/00* (2006.01)
*B65G 51/00* (2006.01)
*B65F 5/00* (2006.01)

(52) U.S. Cl.
CPC ............... *B65G 51/00* (2013.01); *B65F 5/005* (2013.01)

(58) Field of Classification Search
CPC ............ B65G 51/00; B65F 5/005; B65F 5/00
USPC .......... 137/1, 486, 236.1, 602, 605, 606, 607, 137/861, 870, 872, 907
See application file for complete search history.

(56) References Cited

U.S. PATENT DOCUMENTS

| 3,788,338 | A | * | 1/1974 | Burns | 137/1 |
| 4,155,851 | A | * | 5/1979 | Michael | 210/105 |
| 6,565,284 | B2 | * | 5/2003 | Gearhart | 405/37 |
| 2004/0025938 | A1 | * | 2/2004 | Berry, Jr. | 137/236.1 |
| 2005/0236042 | A1 | * | 10/2005 | Hansen et al. | 137/236.1 |
| 2010/0218336 | A1 | * | 9/2010 | Kilhlstrom | 15/301 |
| 2010/0307537 | A1 | * | 12/2010 | Sundholm | 134/21 |

FOREIGN PATENT DOCUMENTS

DE 2340896 3/1974
EP 2022731 A1 2/2009
(Continued)

*Primary Examiner* — Jessica Cahill
(74) *Attorney, Agent, or Firm* — Capitol City TechLaw

(57) ABSTRACT

Vacuum waste collection system is provided (1*a*) by successively selecting a number of branches in a sequence for emptying and transport of waste, wherein the intersection (1, 2, 3, 4) of each next branch in the sequence is at the same o shorter transport distance to a central waste collection point (6) compared to the intersection (1, 2, 3, 4) of the previous branch in the sequence, and collectively transporting accumulated waste from the selected branches towards the central waste collection point (6) by successively operating the air inlet valves (av1, av2, av3, av4, av5) of the corresponding branches. For each selected branch except the last branch, accumulated waste is transported towards the central collection point (6) by causing the corresponding air inlet valve (av1, av2, av3, av4, av5) to be open until it is detected by detector means (WO) in the transport pipe system that the waste has been transported past an intersection (1, 2, 3, 4) to the next branch, and then changing to the next branch For the last branch, accumulated waste is transported to the central waste collection point (6).

22 Claims, 9 Drawing Sheets

(56) References Cited

FOREIGN PATENT DOCUMENTS

| WO | 0105683 A1 | 1/2001 |
| WO | 0105684 A1 | 1/2001 |
| WO | 2004094270 A1 | 11/2004 |
| WO | 2009080885 A1 | 7/2009 |

* cited by examiner

ENERGY-EFFICIENT AND RELIABLE OPERATION OF A VACUUM WASTE COLLECTION SYSTEM

TECHNICAL FIELD OF THE INVENTION

The present invention generally relates to waste management and waste disposal, and more particularly to a method of operating a vacuum waste collection system, a vacuum waste collection system, a control system as well as a computer program product for controlling operation of a vacuum waste collection system.

BACKGROUND OF THE INVENTION

Waste collection systems operating at sub-atmospheric or vacuum pressure for transport of waste by means of suction of air have been in use for many years and are well known to present an efficient, clean and convenient solution to the waste disposal problem. Such systems for suction transport of waste, hereinafter simply referred to as vacuum waste collection systems, have worked remarkably well in smaller and medium-sized residential and office building areas. However, as vacuum waste collection systems have been placed into service in larger and more dense residential and office building areas and/or areas with multi-story buildings of the high-rise type, the demands on the systems have increased considerably.

Attempts have been made to reduce the emptying and collection times by increasing the vacuum in the transport pipes of the system, but unfortunately such an increase of the vacuum will increase the danger of compacting the waste too much, resulting in a plug flow that may cause blockage in the pipes of the system. Such blockage may even shut down an entire branch line or transport line. Another problem related to the employment of increased vacuum levels is the noise that is generated by the resulting airflow through the waste chute in connection with the emptying. In addition, high levels of vacuum may force opened access ports to close rapidly and jam or even injure a person that is about to discharge a bag of waste.

Traditionally, a so-called predefined structured emptying order is used by the system by which waste chutes and transport pipes are emptied in a given order, normally starting with chutes close to the central waste collection point and working towards more remote chutes to avoid blockage in the main pipes.

It is also known to use so-called level-controlled emptying to optimize the performance of vacuum waste collection systems. In level-controlled vacuum waste collection systems, each waste chute is provided with a discrete level sensor for indicating the existence of waste being piled up to a predetermined level in the waste chute. When the waste reaches the predetermined level, the level sensor sends a level-indication signal to the control system. At level-controlled emptying, the control system gives higher priority to waste chutes with level indications, and empties such waste chutes on a "first-come first-serve" basis. In this way, the control system may change the predefined structured emptying order normally used by the system and direct the collection of waste to waste chutes with level indications.

Conventional level-controlled emptying has turned out to be effective at certain load conditions in smaller systems, leading to improved system performance. In larger and more complex systems however, level-controlled emptying tends to have an opposite effect, leading to frequent jumps between different branches of the system and thus inefficient use of the available waste collection resources.

Conventional level-controlled emptying is also inflexible in that once the level sensors have been arranged in the waste chutes, it is difficult to flexibly adapt the predefined levels so as to change the time margins of the vacuum waste collection system and optimize the operation of the system. The predefined level used in conventional level-controlled emptying may be too high to prevent overloading of waste chutes at high load in the system, whereas at low load in the system, the predefined level may be too low for optimal utilization of the resources. Another disadvantage is that the "first-come first-serve" principle does not consider the consequences of the order in which the waste chutes are emptied. For example, there is always the risk of overloading of a waste chute in a critical area, which is not first in the emptying queue.

One way of improving the utilization of the available resources in a vacuum waste collection system and avoiding many of the disadvantages of conventional level-controlled emptying is disclosed in our international application WO 01/05683. The idea here is to partition discharge valves, and hence corresponding waste chutes, into groups and perform controlled emptying of waste by opening discharge valves and initiating collection of discharged waste on a group basis. More particularly, the control system selects one group at a time for opening of discharge valves within the selected group. This approach has turned out to be particularly efficient for larger systems, especially in combination with level-controlled emptying. By performing level-controlled emptying on group level instead of performing level-controlled emptying for individual discharge valves many of the disadvantages of conventional level control are avoided, while the advantages thereof are still obtained.

Further improvements in recent years involve the use of adaptive prediction techniques for improved control of a vacuum waste collection system.

As disclosed in our international application WO 01/05684, future values of one or more operational parameters are adaptively predicted based on a number of consecutive waste level measurements in the system and the operation of the system is controlled accordingly. By using adaptive prediction techniques instead of simple and static rules of thumb, the reliability and efficiency of the overall waste collection system can be substantially improved.

As disclosed in our international patent application WO 2004/094270, selection of a hop to a next branch in a vacuum waste collection system having a multi-branch transport pipe system can be automated by means of an efficient next-hop selection procedure. For each of a number of possible next-hop candidates, representations of future waste chute load levels in a plurality of branches within the system are predicted, and a system consequence value is determined based on these predicted load level representations. Once the system consequence values for the next-hop candidates have been determined, a hop to a next branch is selected among those candidates that have the most favorable system consequence values.

Although many advances have been made within the field of waste management and waste disposal, there is still a potential for further improvements within the general framework of efficient control and operation of vacuum waste collection systems.

In particular, there is a general need to provide more energy-efficient solutions for transport of waste to the central waste collection point, while ensuring reliable operation of the vacuum waste collection system.

SUMMARY OF THE INVENTION

It is a general object of the present invention to provide an improved method of operating a vacuum waste collection system as well as an energy-efficient and reliable vacuum waste collection system.

It is another object of the invention to provide an improved control system for controlling operation of a vacuum waste collection system.

Yet another object of the invention is to provide a computer program for controlling operation of a vacuum waste collection system, when the computer program is running on a computer operatively connected to the system.

These and other objects are met by the invention as defined by the accompanying patent claims.

The invention relates to a vacuum waste collection system having a transport pipe system for transport of waste to a central waste collection point. The transport pipe system includes one or more transport pipes having a number of branches and associated intersections, each branch having an air inlet valve at the end of the branch.

In a first aspect of the invention, a method of operating a vacuum waste collection system is provided. A basic idea is to successively select a number of branches in a sequence for emptying and transport of waste, wherein the intersection of each next branch in the sequence is at the same or shorter transport distance to the central waste collection point compared to the intersection of the previous branch in the sequence, and collectively transport accumulated waste from the selected branches towards the central waste collection point by successively operating the air inlet valves of the corresponding branches. For each selected branch except the last branch, accumulated waste is transported towards the central collection point by causing the corresponding air inlet valve to be open until it is detected by detector means in the transport pipe system that the waste has been transported past an intersection to the next branch, and then changing to the next branch. For the last branch, accumulated waste is transported to the central waste collection point.

In this way, energy-efficient operation of the vacuum waste collection system is obtained, where a much larger portion of the air flow is seized for transport of waste compared to conventional collection procedures.

It is possible to reduce the overall collection time and energy consumption by collectively transporting waste downstream towards the central collection point.

By using detector means in the transport pipe system it is possible to ensure, for each branch except the last, that the accumulated waste is transported past an intersection to the next branch so that no or only insignificant amounts of remaining waste are left in the transport pipe system upstream relative to the intersection to the next branch. In this way, the risk for blockage in the transport pipe system is avoided or at least minimized.

The so-called post-suction time is significantly reduced compared to a situation when the waste of each branch is individually transported all the way to central collection point. With the invention, waste in a branch only needs to be transported past the intersection to the next branch, and then the collection procedure can continue with the next branch.

If an intersection is associated with two or more branches, a branch having longer physical length, or longer so-called equivalent length estimated based on pressure drop in the branch, is preferably selected before a branch having shorter physical length or shorter equivalent length.

In a second aspect of the invention, there is provided a vacuum waste collection system. The vacuum waste collection system comprises waste detectors arranged in the vicinity of the intersections to detect waste in the transport pipe system, and means for successively selecting a number of branches in a sequence for emptying and transport of waste, wherein the intersection of each next branch in the sequence is at the same or shorter transport distance to the central waste collection point compared to the intersection of the previous branch in the sequence. The system also comprises means for controlling transport of waste from the selected branches towards the central waste collection point by successively operating the air inlet valves of the corresponding branches to enable collective transport of accumulated refuse towards the central waste collection point. The controlling means is configured to operate based on input from the waste detectors such that, for each selected branch except the last branch, accumulated waste is transported towards the central collection point by controlling the corresponding air inlet valve to be open until it is detected by one of the waste detectors that the waste has been transported past an intersection to the next branch, and then changing to the next branch, and such that, for the last branch, accumulated waste is transported to the central waste collection point by controlling the corresponding air inlet valve to be open until the accumulated waste has reached the central waste collection point.

In a third aspect, there is provided a control system for controlling operation of a vacuum waste collection system. The control system comprises means for successively selecting a number of branches in a sequence for emptying waste into the transport pipe system and transporting waste towards the central waste collection point, wherein the intersection of each next branch in the sequence is at the same or shorter transport distance to the central waste collection point compared to the intersection of the previous branch in the sequence. The control system also comprises means for determining when to change to a next branch by monitoring detector means in the transport pipe system and performing a controlled change to a next branch when it is detected that waste has been transported past an intersection to a next branch.

In a fourth aspect, there is provided a computer program product for controlling, when running on a computer, operation of a vacuum waste collection system. The computer program product comprises program means for successively selecting a number of branches in a sequence for emptying waste into the transport pipe system and transporting waste towards the central waste collection point, wherein the intersection of each next branch in the sequence is at the same or shorter transport distance to the central waste collection point compared to the intersection of the previous branch in the sequence. The computer program product also comprises program means for determining when to change to a next branch based on input data from detector means in the transport pipe system and performing a controlled change to a next branch when it is detected that waste has been transported past an intersection to a next branch.

The invention offers the following advantages:
Reduced energy consumption.
Reduced collection time.
Reliable operation.
Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
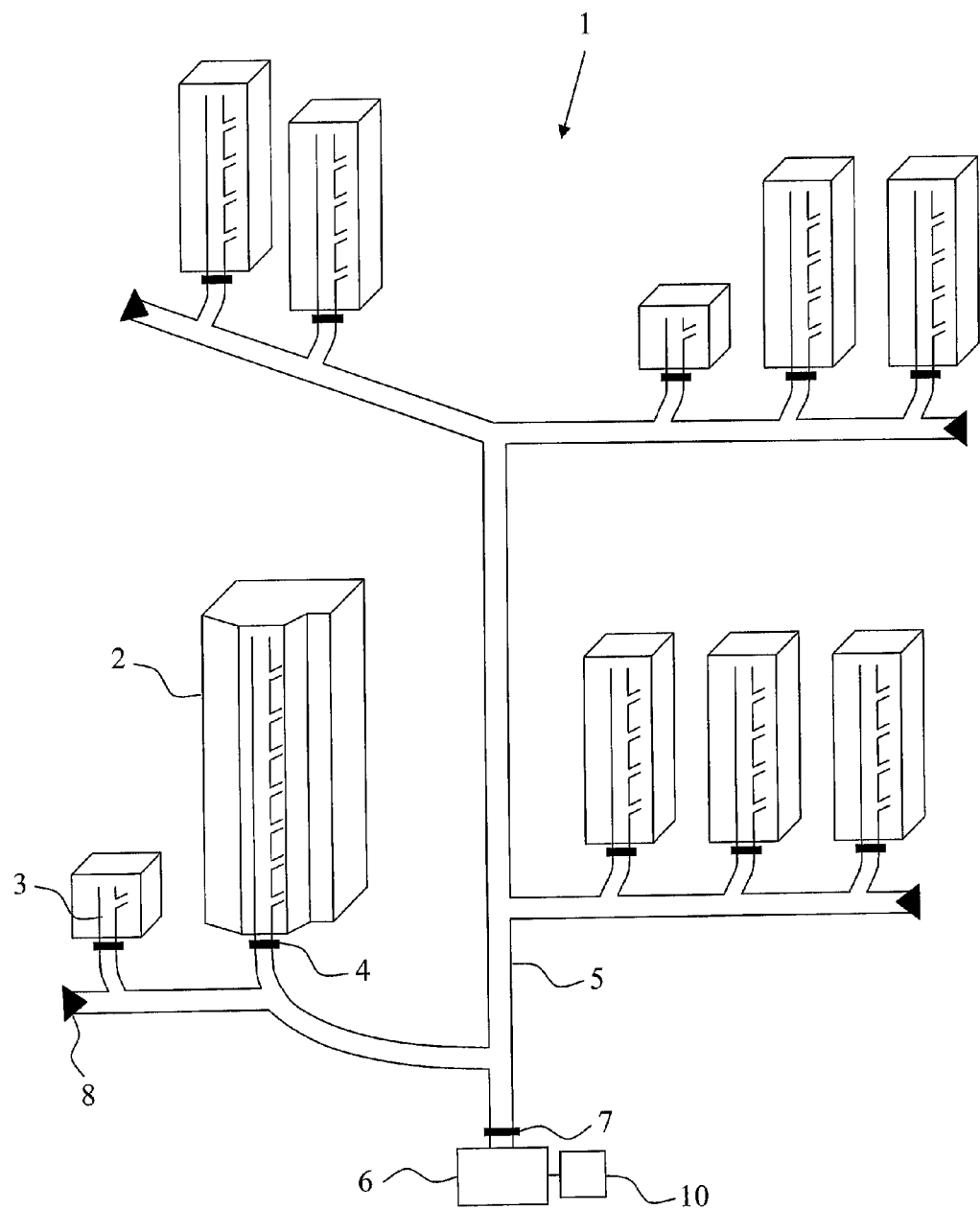
FIG. 1 is a schematic drawing illustrating an example of a vacuum waste collection system.

Throughout the drawings, the same reference characters will be used for corresponding or similar elements.

In order to avoid misconceptions, it should be understood that the term 'waste' not only includes what traditionally is denoted as 'household waste' or 'household garbage' but also includes all fractions within the field of waste disposal such as, but not limited to paper, clothes, laundry, packages and organic waste.

For a better understanding of the invention, a general overview of an example of a vacuum waste collection system will now be made with reference to FIG. 1.

Example System Overview

FIG. 1 is a schematic drawing illustrating an example of a vacuum waste collection system. As an example, assume that the vacuum waste collection system 1 is installed in a residential and/or business area having a number of buildings. Each building 2 is installed with a waste chute 3, or equivalent. In this particular example, the waste chutes are vertical chutes extending vertically through the buildings, and each chute normally has several insertion openings with corresponding access ports (not shown). Each waste chute is equipped with an openable and closable discharge valve 4, preferably positioned in the basement of the building. When opened the discharge valve 4 establishes communication between the waste chute 3 and an underground transport pipe system 5 for discharging the waste gathered upon the valve into the transport pipe. When closed the discharge valve 4 normally blocks the lower end of the waste chute to provide a seal between the chute and the transport pipe.

The vacuum waste collection system normally includes a number of transport pipes which form an underground transport pipe system 5 in which waste is transported to a central waste collection point 6 by means of suction of air. The central waste collection point may include a central waste collection station and/or a docking point to a mobile waste collection facility. The transport pipe system is illustrated as having a main pipe with a number of branches and associated intersections. It should though be understood that the invention is not limited to the particular example of FIG. 1, and that other configurations of the transport pipe system are feasible as well. For example, there may be several main branches, i.e. branches that are directly connected to the central collection point.

Each branch in the system has an air inlet valve 8 at the end of the branch. When the main valve 7 at a central waste collection station or a mobile waste collection facility is opened, the transport pipe system or appropriate parts thereof is exposed to sub-atmospheric pressure or vacuum pressure, and when the air inlet valve 8 of a particular branch is opened the air needed for transporting the waste gathered in the branch transport pipe 5 enters the system and transports the waste to the central collection point 6. Sectioning valves (not shown) may be used to seal different sections of the transport pipe system from each other to ensure sufficient pressure in individual sections for effective suction transport.

Furthermore, the vacuum waste collection system comprises a control system 10 for controlling emptying and collection/transport of waste in the system. The control system 10 is generally configured to control the emptying of waste from the waste chutes into the transport pipe system and the suction transport of waste from different branches of the transport pipe system to the central collection point by controlling the discharge valves, air inlet valves, sectioning valves and main valve of the system according to accepted control technology.

The invention is not concerned with the specific design of the discharge valves, air inlet valves, sectioning valves and main valves, which are all well known in the art and may be of any conventional type used in vacuum waste collection systems. The central waste collection point may include a central waste collection station and/or a docking point to a mobile waste collection unit such as a vacuum truck.

The central waste collection station may be any conventional station known to the art. Typically, once the waste has been transported to the central station, the waste is compacted at the central station and stored in one or more containers or tanks.

For a mobile waste collection solution, any conventional mobile collection unit including a conventional vacuum truck may be used. Typically, the system has a docking point that enables connection to a vacuum truck that may have its own vacuum source onboard to apply primary or secondary vacuum air flow.

Figure 2:
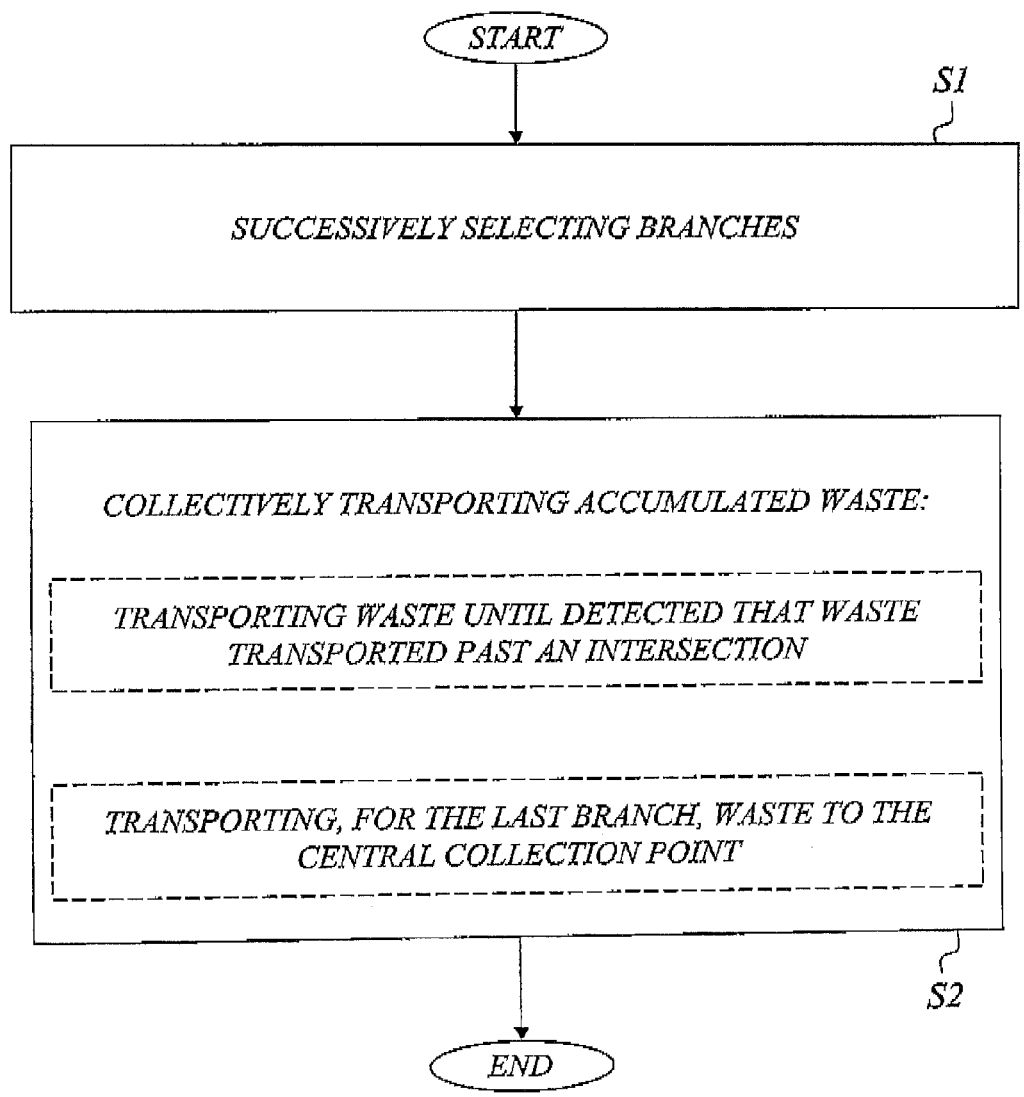
FIG. 2 is a schematic flow diagram of an illustrative method of operating a vacuum waste collection system.

As illustrated in the schematic flow diagram of FIG. 2, a basic idea is to successively select a number of branches (S1) in a sequence for emptying and transport of waste, wherein the intersection of each next branch in the sequence is at the same or shorter transport distance to the central waste collection point compared to the intersection of the previous branch in the sequence, and collectively transport (S2) accumulated waste from the selected branches towards the central waste collection point by successively operating the air inlet valves of the corresponding branches. As shown, the step (S2) of collectively transporting waste involves transporting, for each selected branch except the last branch, accumulated waste towards the central collection point by causing the corresponding air inlet valve to be open until it is detected by detector means in the transport pipe system that the waste has been transported past an intersection to the next branch, and then changing to the next branch. For the last branch, the step (S2) of collectively transporting waste involves transporting accumulated waste to the central waste collection point.

This means that the vacuum waste collection system can be operated in a very energy-efficient manner, where a much larger portion of the air flow is seized for transport of waste compared to conventional collection procedures.

This novel mode of operation makes it possible to reduce the overall collection time and energy consumption. In particular, the period of time when using maximum power of the exhauster can be reduced.

The risk for blockage in the transport pipe system can be avoided or at least minimized by using detector means in the transport pipe system to ensure, for each branch except the last, that the accumulated waste is transported past the intersection to the next branch.

The so-called post-suction time is significantly reduced compared to a situation when the waste of each branch is individually transported all the way to central collection point. With the invention, waste in a branch only needs to be transported past the intersection to the next branch, and then the collection procedure can continue with the next branch.

Preferably, the step (S1) of successively selecting a number of branches in a sequence involves selecting, if an intersection is associated with two or more branches, a branch having longer physical length or longer so-called equivalent length estimated based on pressure drop in the branch before a branch having shorter physical length or shorter equivalent length.

The equivalent length is normally estimated based on pressure drop in the branch or pipe, and thus not only considers actual length but also accounts for factors such as the number of bends, valves and other factors.

The above-described steps are typically performed for each main transport pipe of the vacuum waste collection system, if desired.

It should be understood that the selected branches in the sequence may be all the branches of a main transport pipe within the transport pipe system or a sub-set of the branches of a main transport pipe. In the latter case, the sub-set may be e.g. only those branches that have waste chutes with relatively high levels of waste or an otherwise limited set of considered branches.

In other words, the branches are selected according to a so-called "downstream" order, where the intersection of a next branch is normally located at the same transport distance or more downstream compared to the intersection of a previous branch.

Preferably, the sequence starts with a branch associated with the intersection having the longest transport distance, or longest equivalent length estimated based on pressure drop, to the central waste collection point. If the intersection having the longest transport distance or equivalent length to the central waste collection point is associated with two or more branches, the sequence normally starts with the branch having the longest physical length or longest equivalent length estimated based on pressure drop in the branch. For example, if several branches are associated to the most "remotely" located intersection, the sequence may start with the longest branch or the branch having the biggest pressure drop considering not only actual length but accounting also for factors such as the number of bends, valves and other factors that increase the so-called equivalent length.

Normally, the air inlet valves of the branches are successively operated to be open one at a time.

It may however be the case that the procedure of successively operating the air inlet valves includes causing, for at least one branch, an air inlet valve of a previous branch to also be open during a period of time. For example, an "additional" air inlet valve of a previous branch may be opened to assist in or take over the transport of accumulated waste during a period of time.

In a particular example, the step (S1) of successively selecting a number of branches may involve consulting a table-based map of the transport pipe system to find the next branch. Such a table-based map may be defined, e.g. by a table associating each branch with an intersection and indicating, for each intersection, a next intersection being located at the same or shorter transport distance to the central waste collection point.

When all branches of a given intersection have been processed, a next intersection is identified in the table-based map and then a next branch associated with the identified intersection can be determined. This will be explained with reference to some illustrative examples later on.

Preferably, the table is configured for indicating, for each branch, the physical length of the branch or the equivalent length estimated based on pressure drop in the branch, and if the identified intersection is associated with two or more branches, a branch having longer physical length or longer so-called equivalent length in the branch is normally selected before a branch having shorter physical length or shorter equivalent length.

For a better understanding of the invention, reference will now be made to FIGS. 3-8 that illustrate various examples of implementation.

Figure 3:
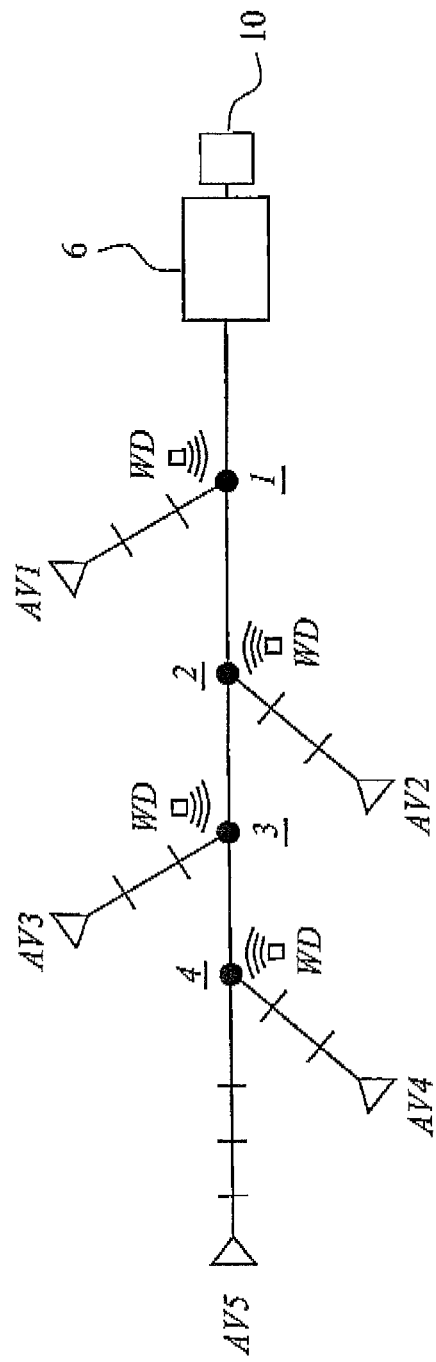
FIG. 3 is a schematic drawing illustrating an example of a main pipe having a number of branches and being connected to a central collection point.

FIG. 3 is a schematic drawing illustrating an example of a main pipe having a number of branches and being connected to a central collection point 6. In this particular example, a main transport pipe having a number of branches and associated intersections is illustrated. The main transport pipe is connected to the central collection point 6. Each branch has a number of waste chutes (indicated by a line perpendicular to the branch pipe), and also has an air inlet valve (AV) at the end of the branch. Waste detectors (WD) are arranged in the vicinity of the intersections (1, 2, 3, 4) to detect waste in the transport pipe system.

The control system 10 of the vacuum waste collection system is configured for successively selecting a number of branches in a sequence for emptying and transport of waste, wherein the intersection of each next branch in the sequence is at the same or shorter transport distance to the central waste collection point compared to the intersection of the previous branch in the sequence. By means of controlled successive operation of the air inlet valves, waste may be collectively transported through the transport pipe from the selected branches downstream towards the central waste collection point.

Preferably, the control system 10 is configured to select, if an intersection is associated with two or more branches, a branch having longer physical length or longer so-called equivalent length estimated based on pressure drop in the branch before a branch having shorter physical length or shorter equivalent length.

In this example, the sequence starts with the branch of AV5, and then continues with the branch of AV4, the branch of AV3, the branch of AV2 and finally the branch of AV1. For simplicity, a branch will be denoted by its associated air inlet valve (AV) in the following.

Compared to conventional modes of operation, this sequence (AV5, AV4, AV3, AV2, AV1) is a so-called reverse or inverse sequence, starting with a branch associated with the intersection having the longest transport distance (or longest equivalent length) to the central waste collection point. It should be understood that it would also be feasible to start the collection sequence with AV4, and continue with AV5, and then AV3, AV2, and AV1.

The control system 10 is normally configured to start, if the intersection having the longest transport distance or equivalent length to the central waste collection point is associated with two or more branches, the sequence with the branch having the longest physical length or longest equivalent length estimated based on pressure drop in the branch. In the example of FIG. 3, the branch of AV5 is considered to have the longest physical length and/or equivalent length, and therefore the sequence starts with AV5.

Preferably, the control system 10 is configured for controlling the transport of waste based on input from the waste detectors (WD). In particular, the control system 10 is configured to operate based on input from the waste detectors such that, for each selected branch except the last branch, accumulated waste is transported towards the central collection point 6 by controlling the corresponding air inlet valve (AV) to be open until it is detected by one of the waste detectors (WD) that the waste has been transported past an intersection to the next branch, and then changing to the next branch, and such that, for the last branch, accumulated waste is transported to the central waste collection point by controlling the corresponding air inlet valve to be open until the accumulated waste has reached the central waste collection point.

In this example, the discharge valves of the waste chutes of branch AV5 are opened and waste from the waste chutes are emptied into the branch pipe, and once the last discharge valve in this particular branch is closed, AV5 is opened and the waste is transported by suction of air towards the central collection point 6. Once the waste detector arranged in the vicinity of intersection 4 detects that the waste has been transported past intersection 4, the next branch AV4 is selected.

The discharge valves of the waste chutes of branch AV4 are opened and waste from the waste chutes are emptied into the branch pipe, and once the last discharge valve in this particular branch is closed, AV4 is opened and the waste is transported by suction of air towards the central collection point 6. Once the waste detector arranged in the vicinity of intersection 3 detects that the accumulated waste (from branch AV5 and branch AV4) has been transported past intersection 3, the next branch AV3 is selected.

The discharge valves of the waste chutes of branch AV3 are opened and waste from the waste chutes are emptied into the branch pipe, and once the last discharge valve in this particular branch is closed, AV3 is opened and the waste is transported by suction of air towards the central collection point 6. Once the waste detector arranged in the vicinity of intersection 2 detects that the accumulated waste (from branch AV5, branch AV4 and branch AV3) has been transported past intersection 2, the next branch AV2 is selected.

The discharge valves of the waste chutes of branch AV2 are opened and waste from the waste chutes are emptied into the branch pipe, and once the last discharge valve in this particular branch is closed, AV2 is opened and the waste is transported by suction of air towards the central collection point 6. Once the waste detector arranged in the vicinity of intersection 1 detects that the accumulated waste (from branch AV5, branch AV4, branch AV3 and branch AV2) has been transported past intersection 1, the last branch AV1 is selected.

For the last branch AV1, the discharge valves of the waste chutes are opened and waste is emptied into the branch pipe, and once the last discharge valve in this particular branch is closed, AV1 is opened and the waste from this branch is transported together with the accumulated waste from (at least some of) branches AV5 to AV2 into the central waste collection point 6. It may be the case that at least some of the accumulated waste from the previous branches has already reached the central collection point.

In other words, the control system 10 is configured for determining when to change to a next branch by monitoring the waste detectors in the transport pipe system and performing a controlled change to a next branch when it is detected that waste has been transported past an intersection to a next branch.

Typically, the control system 10 is configured to start with a branch associated with the intersection having the longest transport distance (or equivalent length) to the central waste collection point. If several branches are associated to the most "remotely" located intersection, the collection sequence may start with the longest branch or the branch having the biggest pressure drop considering not only actual length but also factors such as the number of bends.

Normally, the control system 10 is configured to control the air inlet valves of the different branches to be open one at a time.

However, the control system 10 may alternatively control, for at least one branch, an air inlet valve of a previous branch to also be open during a period of time. For example, the "additional" air inlet valve of a previous branch may be opened to assist in or take over the transport of accumulated waste during a period of time.

In an exemplary embodiment, a table-based map of the transport pipe system is built and consulted by the control system 10 to find the next branch. Such a table-based map may be defined, e.g. by a table associating each branch (and corresponding AV) with an intersection and indicating, for each intersection, the next intersection (located at the same or shorter transport distance to the central waste collection point). When all branches of a given intersection have been processed, the next intersection is identified in the table-based map and then a next branch associated with the identified intersection can be determined.

With reference to the example of FIG. 3, a table-based map of the transport pipe system may be defined by the example below.

| AV (Branch) | Associated intersection |
| --- | --- |
| AV1 | 1 |
| AV2 | 2 |
| AV3 | 3 |
| AV4 | 4 |
| AV5 | 4 |

| Intersection | Next intersection |
| --- | --- |
| 1 | Collection point |
| 2 | 1 |
| 3 | 2 |
| 4 | 3 |

It is determined that the collection sequence should start with AV4 or AV5 since these branches are associated with the most remotely located intersection 4. In this example, AV5 is selected first. As mentioned, AV5 is associated with intersection 4. AV4 is also associated with intersection 4, and is therefore the next AV/branch to process. The next intersection is intersection 3, which is associated with AV3. The next intersection is intersection 2, which is associated with AV2. The next intersection is intersection 1, which is associated with AV1.

The above table-based map is a relatively simple example, and a more detailed example including information about distances and/or equivalent lengths in the transport pipe system will be given later on.

In this way, a sequence of branches/air inlet valves can be determined by consulting the table-based map. The use of a table-based map has turned out to be particularly useful in large systems with many branches and intersections, where a table-based map can be helpful in automating the successive selection of branches. The operator enters the information about branches/air inlet valves and intersections into the table at set-up of the system control. The control system 10 may then consult the table to determine next branch in the collection sequence.

Figure 4:
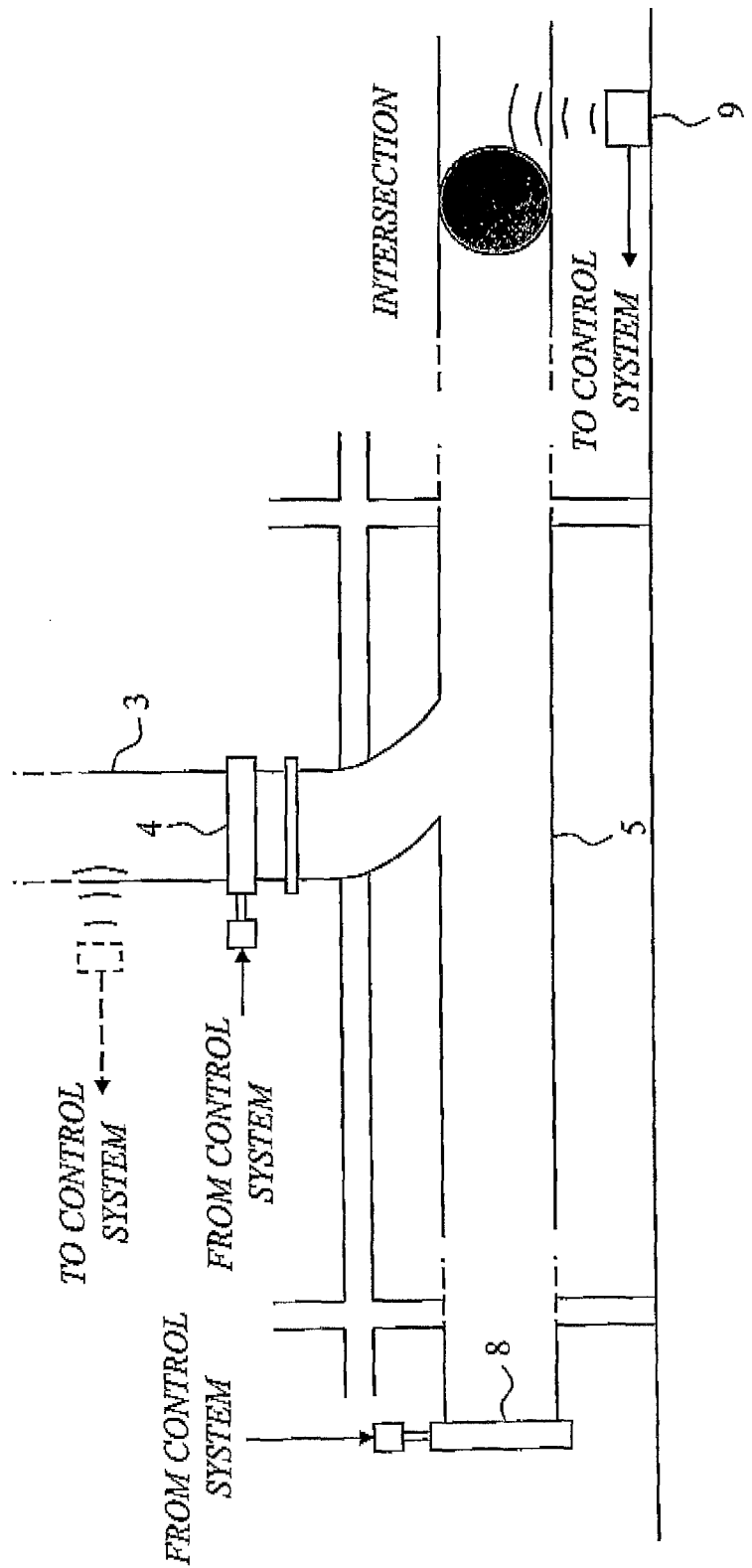
FIG. 4 is a schematic diagram illustrating a structural view of a limited part of an exemplary vacuum waste collection system.

FIG. 4 is a schematic diagram illustrating a structural view of a limited part of an exemplary vacuum waste collection system. A waste chute 3 is installed in a building in a conventional manner and is equipped with an openable and closable discharge valve 4. The discharge valve 4 is preferably positioned in the basement of the building and is used for establishing communication between the waste chute 3 and a branch pipe of an underground transport pipe system 5. At the end of the branch pipe, an air inlet valve 8 is arranged. The air inlet valve 8 and the discharge valve 4 are controlled by the control system, which sends appropriate control signals in order to control the opening and closing of the valves.

FIG. 4 also illustrates an intersection with another branch, and a waste detector 9 arranged in the vicinity of the intersection. The waste detector 9 may be any suitable type of detector capable of detecting the presence of waste in the transport pipe including for example ultrasonic, optic, magnetic and radio-type detectors. It is also possible to utilize a so-called color sensor (RX sensor) that is normally used for detecting the color of waste items such as bags and the classified waste type thereof. The waste detector 9 is preferably configured for generating signal information representative of the presence of waste. The signal information is preferably sent to the control system for use in controlling the transport of waste towards the central collection point.

The waste chute 3 may also have an optional level indicator system, for example in the form of a level sensor for measuring or otherwise indicating the level of waste in the waste chute 3. The level sensor may be any type of level sensor including ultrasonic, optic, magnetic, radio-type sensors, and color sensors. The level sensor is normally positioned in the chute wall or in the vicinity thereof, and configured to generate signal information representative of the level of waste in the chute 3. The signal information is preferably sent to the control system for use in controlling the emptying of waste.

Figure 5:
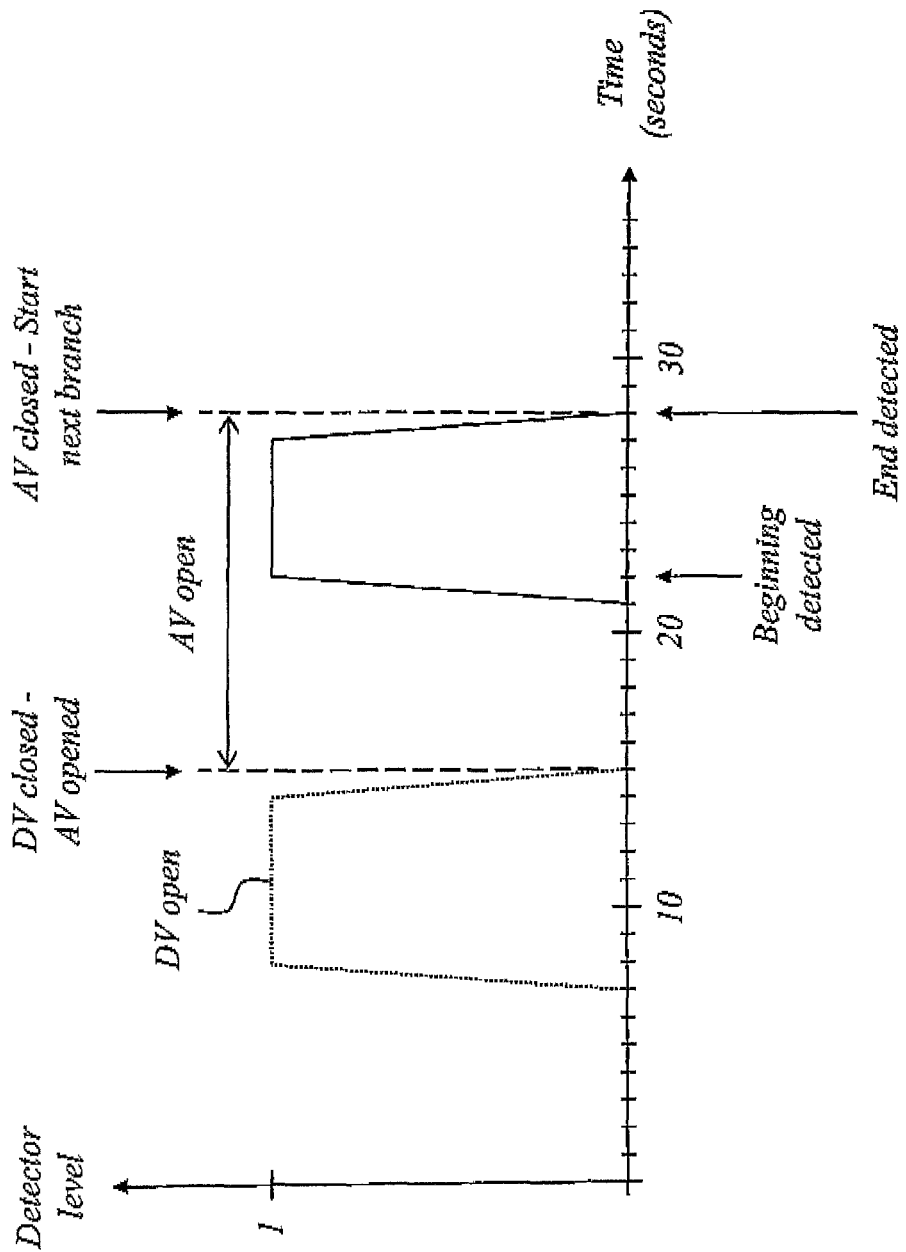
FIG. 5 is a schematic diagram illustrating an example of the detector output level of a waste detector situated in the vicinity of a branch intersection in the transport pipe system.

FIG. 5 is a schematic diagram illustrating an example of the detector output level of a waste detector situated in the vicinity of a branch intersection in the transport pipe system. A detector output level that is equal to 0 means that no waste or waste is currently detected, whereas a detector output level equal to 1 means that the detector has detected waste or waste in the transport pipe at the intersection. When the last discharge valve (DV) has closed, the corresponding air inlet valve (AV) is opened at t=15 seconds. Waste is then started to be transported by suction of air towards the central collection system.

The period of time during which the AV is open is referred to as the post suction time. Instead of transporting the waste all the way to the central collection point, which would require a rather long post suction time, the invention proposes to keep the air inlet valve open until it is detected that the waste has been transported past an intersection to a next branch, and then changing to the next branch.

In the particular example of FIG. 5, the detector output levels indicate that waste (beginning of waste flow) is first detected at t=22 seconds, and that waste is being detected until t=28 seconds (end of waste flow). This means that the waste has been transported past the intersection where the waste detector is located, and thus the air inlet valve (AV) is closed, and the next branch is selected.

When waste is waiting some distance downstream of the intersection, and waste from waste chutes have been emptied into the next branch associated with the intersection, there may be waste at slightly different locations in the transport pipe system. By using simple rules of thumb and/or information on average waste speed and distances between waste chutes and/or air inlet valves on one hand and the associated intersections on the other hand, it is possible to detect the beginning and end of a waste flow although there may be some distance between waste items. It is thus not necessary to consider a completely "continuous" flow of waste.

Figure 6:
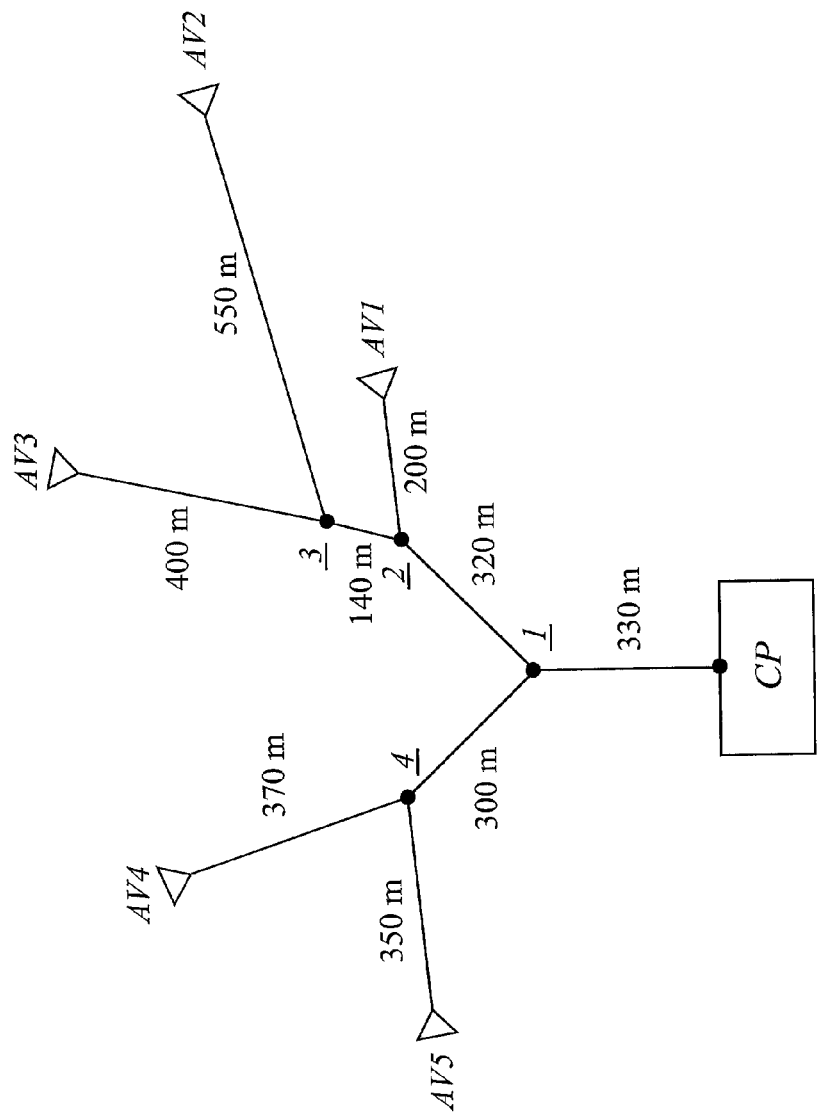
FIG. 6 is a schematic diagram illustrating a logical view of an example of a vacuum waste collection system.

FIG. 6 is a schematic diagram illustrating a logical view of an example of a vacuum waste collection system. An example of a table-based map of the transport pipe system of FIG. 6 can be defined as:

| Intersection | Next intersection | Distance to next intersection (m) |
|---|---|---|
| 1 | Collection point | 330 |
| 2 | 1 | 320 |
| 3 | 2 | 140 |
| 4 | 1 | 300 |

| AV | Associated intersection | Distance to associated intersection (m) | Equivalent length (m) |
|---|---|---|---|
| AV1 | 2 | 200 | 210 |
| AV2 | 3 | 550 | 570 |
| AV3 | 3 | 400 | 415 |
| AV4 | 4 | 370 | 370 |
| AV5 | 4 | 350 | 380 |

In this example, the table also indicates, for each AV/branch, the physical length of the branch (i.e. the actual distance from the AV to the associated intersection) or equivalent length estimated based on pressure drop in the branch.

It should also be understood that the distances to the next intersection may alternatively be expressed in equivalent length.

The control system 10 is configured to consult the table-based map to find the next branch. When all branches of a given intersection have been processed, the next intersection is identified in the table-based map and then a next branch associated with the identified intersection can be determined. In this example, if the identified intersection is associated with two or more branches, a branch having longer physical length or longer so-called equivalent length estimated based on pressure drop in the branch is selected before a branch having shorter physical length or shorter equivalent length.

From the above table it can be seen that intersection 3 has the longest transport distance (and/or equivalent length) to the central collection point (CP). Two branches (AV2 and AV3) are associated with this intersection. AV2 is the longest branch of the two, and therefore it is decided to start the collection procedure with AV2. AV2 is kept open until waste from branch AV2 has been transported just past the intersection (intersection 1) to the next branch as detected by waste detector means (not shown in FIG. 6). AV3 is also associated with intersection 3, and is therefore the next AV/branch to process. AV3 is kept open until waste of branch AV3 and the previously accumulated waste from branch AV2 has been transported just past the intersection (intersection 2) to the next branch as detected by waste detector means. AV1 is associated with intersection 2 and is the next AV/branch to process. AV1 is kept open until waste of branch AV1 and the previously accumulated waste from branches AV2 and AV3 has been transported just past the intersection (intersection to the next branch as detected by waste detector means.

The intersection 1 has a branch to another intersection 4, which in turn has two further branches with corresponding air inlet valves AV4 and AV5. These two branches AV4 and AV5 may be considered independently of the other branches in a separate sequence if desired. Considering actual physical length, AV4 is selected first and kept open until waste from this branch has been transported past the intersection (intersection 4) to the next branch as detected by waste detector means. When AV4 is open, the air flow will also transport the waste previously accumulated at intersection 1 all the way (or at least closer) to the collection point. From the table it can be seen that AV5 is also associated with intersection 4, which is the next AV/branch to process. Since AV5 is the final AV/branch, AV5 is opened and waste from branch AV5 is transported together with (i.e. in the same air flow) the waste previously accumulated at intersection 4 all the way to the central collection point.

In this example, the overall AV sequence is thus defined as: AV2, AV3, AV1, AV4, AV5. However, it should be understood that as an option it may be possible to start with AV3, followed by AV2, since both these branches are connected to the same intersection (i.e. intersection 3). This option will anyway allow successive collective transport of waste towards the central collection point. However, in this example, both physical length and equivalent length indicate that AV2 should be selected before AV3. Considering equivalent length, AV5 may be selected before AV4 since these branches are connected to the same intersection (i.e. intersection 4) and the branch of AV5 has a longer equivalent length than the branch of AV4.

Figure 7:
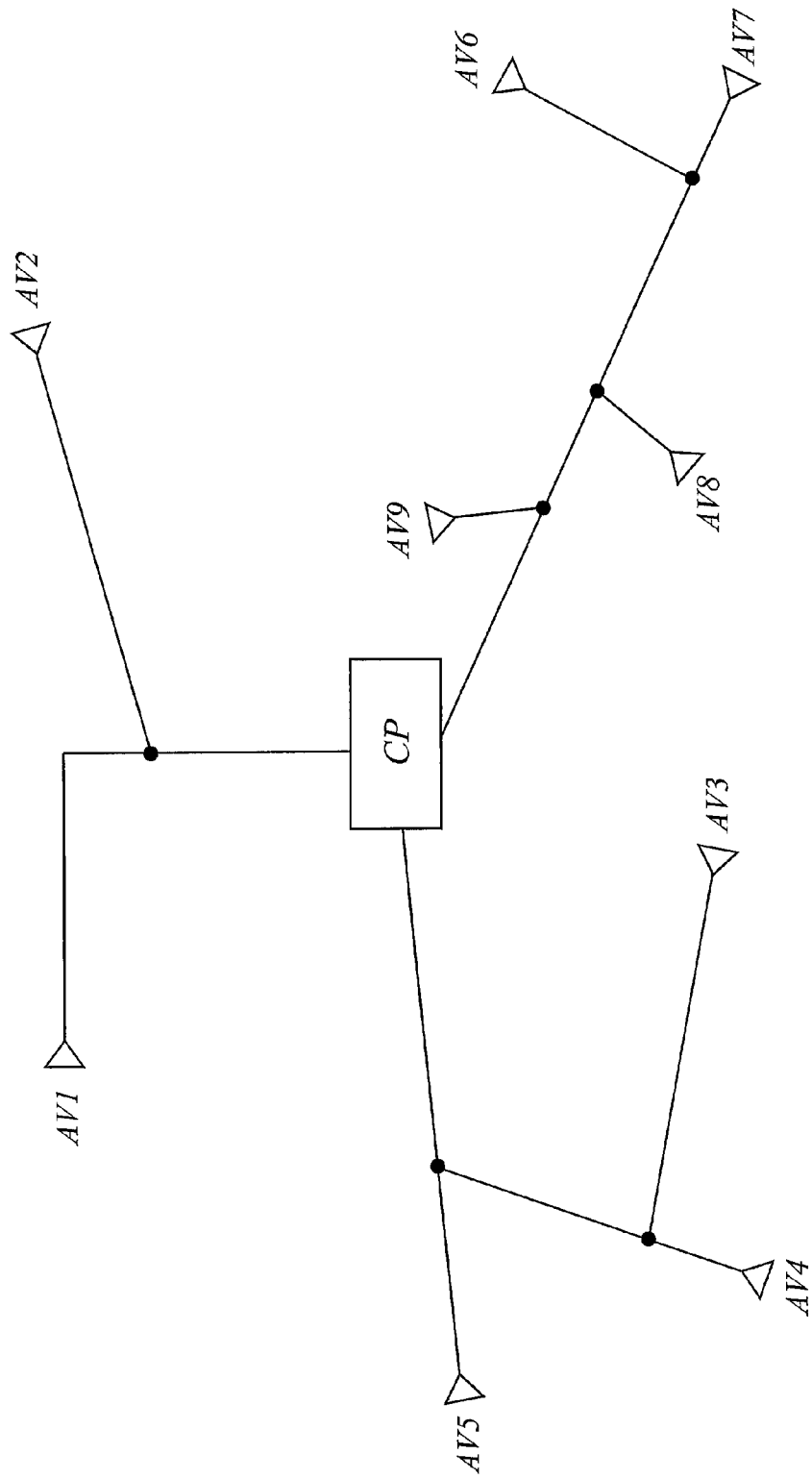
FIG. 7 is a schematic diagram illustrating a logical view of another example of a vacuum waste collection system having a number of main transport pipes.

FIG. 7 is a schematic diagram illustrating a logical view of another example of a vacuum waste collection system having a number of main transport pipes. In this example, there are three main pipes, each of which has a number of branches. Each main pipe is directly connected to the collection point (CP). Waste detectors (not shown in FIG. 7) are arranged at the branch intersections. By starting "upstream" and selecting branches successively closer and closer (more and more downstream) to the central collection point for emptying and transport of waste, an example of a collection sequence could be: AV1, AV2; AV3, AV4, AV5, AV6, AV7, AV8, AV9. This can be compared to an example of a normal conventional collection sequence: AV2, AV1; AV5, AV4, AV3; AV9, AV8, AV7, AV6.

Figure 8:
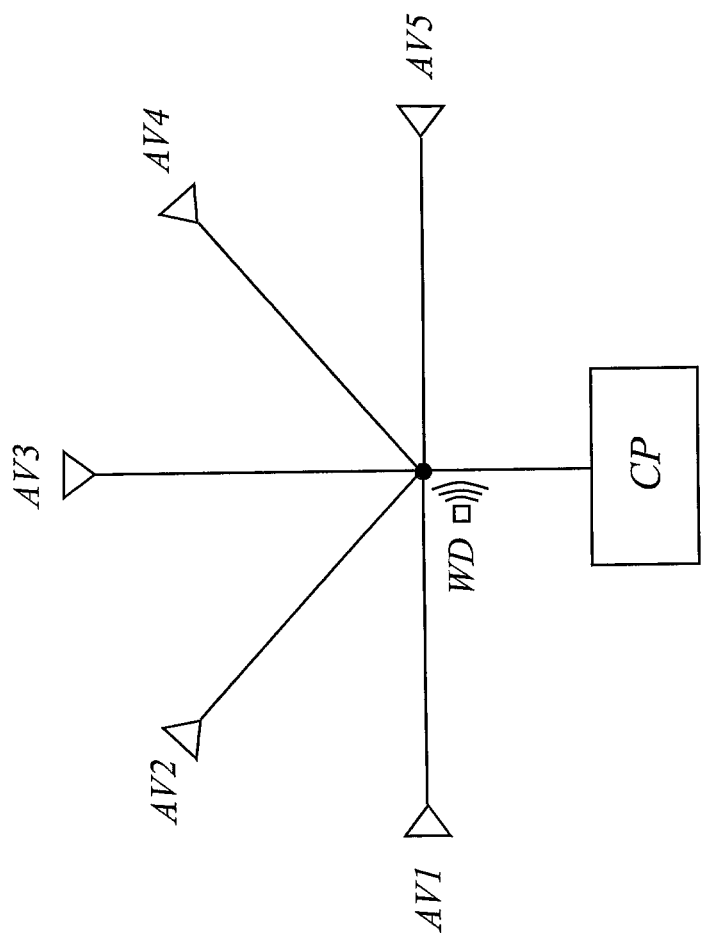
FIG. 8 is a schematic diagram illustrating a logical view of yet another example of a vacuum waste collection system.

FIG. 8 is a schematic diagram illustrating a logical view of yet another example of a vacuum waste collection system. In this example, a number of branches, AV1 to AV5, have the same intersection. Anyway, the invention may be applicable to provide a more energy-efficient collection procedure. Instead of transporting the waste of a selected branch all the way to the central collection point, which would require a rather long post suction time, the invention proposes to keep the air inlet valve of the selected branch open until it is detected by a waste detector (WD) that the waste has been transported past the common intersection, and then changing to the next branch. This type of design/solution for a system or system part with many branches having a common intersection may be useful when the waste input flow is relatively small, thus reducing the risk for blockage at the common intersection. It may also be possible to adapt the dimensions of the main transport pipe from the intersection down to the central collection point and/or mechanically design the intersection to facilitate the waste flow and minimize the risk for waste blockage.

The above actions/steps/procedures for controlling the operation of the vacuum waste collection can for example be performed by a computer, by executing program elements such as functions, procedures or equivalents. These program elements may be written in a functional programming language, an object oriented programming language or any other suitable programming language and arranged as a computer program for execution by processor hardware. Conventional processor technologies, including CPU (Central Processing Unit) technologies, DSP (Digital Signal Processor) technologies, ASIC (Application Specific Integrated Circuit) technologies, but also PLC (Programmable Logic Controller) technologies, may be used for implementation.

The waste collection system is preferably controlled by a computer-implemented control system, which has functions for monitoring and controlling the waste collection system.

Control System Overview

Figure 9:
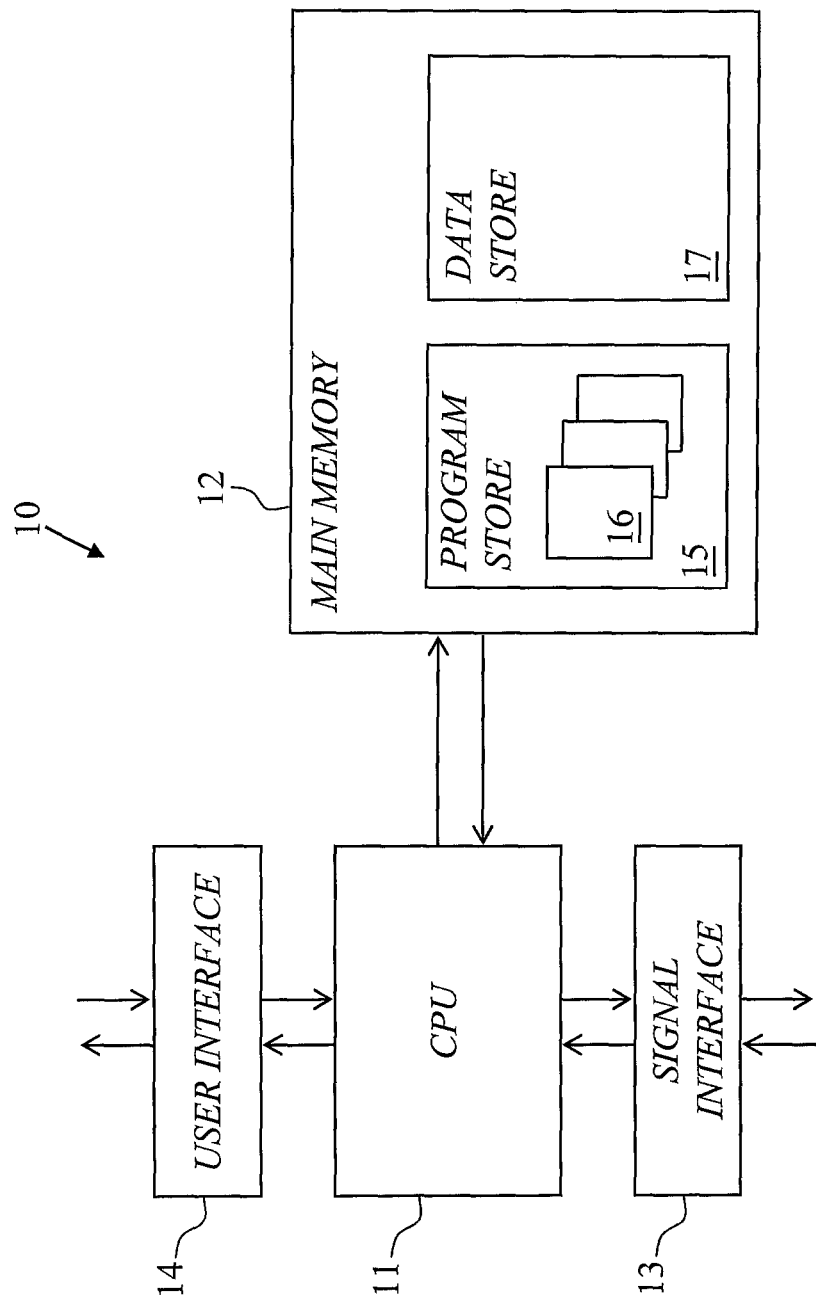
FIG. 9 is a schematic drawing of an example of a computer-implemented control system.

FIG. 9 is a schematic drawing of an example of a computer-implemented control system. The control system 10 basically comprises a computer or processor system in which one or more computer programs are being executed to perform the functions for monitoring and controlling the waste collection system. The computer-based control system 10 includes a CPU 11 or equivalent, a main memory 12, a conventional signal interface 13 and a conventional user interface 14. The main memory 12 has a program store 15 for computer programs 16 and a data store 17 for data.

The control system is connected to the other components of the waste collection system through conventional communication links and the control system utilizes the signal interface 13 for receiving signal information from the waste collection system and for sending control signals to discharge valves, air inlet valves, sectioning valves and the main valve of the waste collection system. In particular, the signal interface 13 is used for receiving information from waste detectors in the transport pipe system, and optionally also from level sensors of the waste chutes.

This information is then processed by the computer program(s) 16 running on the computer system, and the above-described procedure(s) is thereby executed, resulting in appropriate control signals being sent to the relevant discharge valves, air inlet valves and main valve for effectuating controlled emptying and collection of waste.

The computer program(s) comprises program means for successively selecting a number of branches in a sequence for emptying waste into the transport pipe system and transporting waste towards the central waste collection point, wherein the intersection of each next branch in the sequence is at the same or shorter transport distance to the central waste collection point compared to the intersection of the previous branch in the sequence. The computer program product also comprises program means for determining when to change to a next branch based on input data from detector means in the transport pipe system and performing a controlled change to a next branch when it is detected that waste has been transported past an intersection to a next branch.

In a preferred example, the program means for successively selecting a number of branches in a sequence is configured to select, if an intersection is associated with two or more branches, a branch having longer physical length or longer so-called equivalent length estimated based on pressure drop in the branch before a branch having shorter physical length or shorter equivalent length.

The computer program is preferably realized as a computer program product, which is normally carried on a computer-readable medium.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of operating a vacuum waste collection system having a transport pipe system for transport of waste to a central waste collection point, the transport pipe system including one or more transport pipes having a number of branches and associated intersections, each branch having an air inlet valve at an end of the branch, the method comprising:
successively selecting a number of branches in a sequence for emptying and transport of waste, wherein the intersection of each next branch in the sequence is at the same or shorter transport distance to the central waste collection point compared to the intersection of a previous branch in the sequence; and
collectively transporting accumulated waste from the selected branches towards the central waste collection point by successively operating the air inlet valves of the corresponding branches;
wherein collectively transporting accumulated waste involves
transporting, for each selected branch except a last branch in the sequence, accumulated waste towards the central collection point by opening the corresponding air inlet valve until detector means in the transport pipe system detects that the waste has been transported past an intersection to the next branch, and then changing to the next branch, and
transporting, for the last branch, accumulated waste to the central waste collection point.

2. The method of claim 1, wherein successively selecting a number of branches in a sequence involves
selecting, if an intersection is associated with two or more branches, a branch having a longer physical length or a longer equivalent length estimated based on pressure drop in the branch before a branch having a shorter physical length or a shorter equivalent length.

3. The method of claim 1, wherein the sequence starts with a branch associated with the intersection having the longest transport distance, or the longest equivalent length estimated based on pressure drop, to the central waste collection point, and
wherein, if the intersection having the longest transport distance or the longest equivalent length to the central waste collection point is associated with two or more branches, the sequence starts with the branch having the longest physical length or the longest equivalent length estimated based on pressure drop in the branch.

4. The method of claim 1, wherein collectively transporting accumulated waste from the selected branches towards the central waste collection point by successively operating the air inlet valves of the corresponding branches involves one of
opening the air inlet valves one at a time, and
for at least one branch, opening an air inlet valve of a previous branch during a period of time.

5. The method of claim 1, wherein the method is performed for each main transport pipe of the vacuum waste collection system; and
wherein the central waste collection point includes a central waste collection station or a docking point to a mobile waste collection facility.

6. The method of claim 1, wherein successively selecting a number of branches involves consulting a table-based map of the transport pipe system to find the next branch, the table-based map being defined by a table associating each branch with an intersection and indicating, for each intersection, a next intersection being located at the same or shorter transport distance to the central waste collection point.

7. The method of claim 6, wherein consulting a table-based map of the transport pipe system to find the next branch involves identifying, when all branches of a given intersection have been processed, the next intersection in the table-based map and then finding a next branch associated with the identified intersection.

8. The method of claim 7, wherein the table indicates, for each branch, the physical length of the branch or the equivalent length estimated based on pressure drop in the branch; and
wherein finding a next branch associated with the identified intersection involves selecting, if the intersection is associated with two or more branches, a branch having a longer physical length or a longer equivalent length estimated based on pressure drop in the branch before a branch having a shorter physical length or a shorter equivalent length.

9. A vacuum waste collection system comprising:
a transport pipe system for transport of waste to a central waste collection point, the transport pipe system including a transport pipe having a number of branches and associated intersections, each branch having an air inlet valve at an end of the branch;
waste detectors arranged in the vicinity of the intersections to detect waste in the transport pipe system;
means for successively selecting a number of branches in a sequence for emptying and transport of waste, wherein the intersection of each next branch in the sequence is at the same or shorter transport distance to the central waste collection point compared to the intersection of a previous branch in the sequence; and
means for controlling transport of waste from the selected branches towards the central waste collection point by successively operating the air inlet valves of the corresponding branches to enable collective transport of accumulated waste towards the central waste collection point;
wherein the means for controlling transport of waste is
configured to operate based on input from the waste detectors,
for each selected branch except a last branch in the sequence, configured to open the corresponding air inlet valve until it is detected by one of the waste detectors that the accumulated waste has been transported past an intersection to a next branch, and then change to the next branch, and
for the last branch, configured to open the corresponding air inlet valve until the accumulated waste has reached the central waste collection point.

10. The vacuum waste collection system of claim 9, wherein the means for successively selecting a number of branches in a sequence is configured to select, if an intersection is associated with two or more branches, a branch having a longer physical length or a longer equivalent length estimated based on pressure drop in the branch before a branch having a shorter physical length or a shorter equivalent length.

11. The vacuum waste collection system of claim 9, wherein the means for successively selecting a number of branches is configured to start the sequence with a branch associated with an intersection having the longest transport distance, or the longest equivalent length estimated based on pressure drop, to the central waste collection point; and wherein, if the intersection having the longest transport distance or the longest equivalent length to the central waste collection point is associated with two or more branches, the means for successively selecting a number of branches is configured to start the sequence with the branch having the longest physical length or the longest equivalent length estimated based on pressure drop in the branch.

12. The vacuum waste collection system of claim 9, wherein the means for controlling transport of waste from the selected branches towards the central waste collection point by successively operating the air inlet valves of the corresponding branches includes one of means for opening the air inlet valves one at a time, and for at least one branch, means for opening an air inlet valve of a previous branch during a period of time.

13. The vacuum waste collection system of claim 9, wherein the central waste collection point includes a central waste collection station or a docking point to a mobile waste collection facility.

14. The vacuum waste collection system of claim 9, wherein the means for successively selecting a number of branches includes means for consulting a table-based map of the transport pipe system to find the next branch, the table-based map being defined by a table associating each branch with an intersection and indicating, for each intersection, a next intersection being located at the same or shorter transport distance to the central waste collection point.

15. The vacuum waste collection system of claim 14, wherein the means for consulting a table-based map of the transport pipe system to find the next branch includes means for identifying, when all branches of a given intersection have been processed, the next intersection in the table-based map and then finding a next branch associated with the identified intersection.

16. A control system for controlling operation of a vacuum waste collection system having a transport pipe system for transport of waste to a central waste collection point, the transport pipe system including a transport pipe having a number of branches and associated intersections, each branch having an air inlet valve at an end of the branch, the control system comprising:

means for successively selecting a number of branches in a sequence for emptying waste into the transport pipe system and transporting waste towards the central waste collection point, wherein the intersection of each next branch in the sequence is at the same or shorter transport distance to the central waste collection point compared to the intersection of a previous branch in the sequence; and means for controlling the air inlet valves of the selected branches to enable collective transport of accumulated waste towards the central waste collection point, and for determining when to change to a next branch by monitoring detector means in the transport pipe system, and for performing a controlled change to a next branch when it is detected that waste has been transported past an intersection to a next branch.

17. The control system of claim 16, wherein the means for successively selecting a number of branches in a sequence is configured to select, if an intersection is associated with two or more branches, a branch having a longer physical length or a longer equivalent length estimated based on pressure drop in the branch before a branch having a shorter physical length or a shorter equivalent length.

18. The control system of claim 16, wherein the means for successively selecting a number of branches is configured to start the sequence with a branch associated with the intersection having the longest transport distance, or the longest equivalent length estimated based on pressure drop, to the central waste collection point, and wherein, if the intersection having the longest transport distance or the longest equivalent length to the central waste collection point is associated with two or more branches, the means for successively selecting a number of branches is configured to start the sequence with the branch having the longest physical length or the longest equivalent length estimated based on pressure drop in the branch.

19. The control system of claim 16, wherein the means for successively selecting a number of branches includes means for consulting a table-based map of the transport pipe system to find the next branch, the table-based map being defined by a table associating each branch with an intersection and indicating, for each intersection, a next intersection being located at the same or shorter transport distance to the central waste collection point.

20. The control system of claim 19, wherein the means for consulting a table-based map of the transport pipe system to find the next branch includes means for identifying, when all branches of a given intersection have been processed, the next intersection in the table-based map and then finding a next branch associated with the identified intersection.

21. A computer program product for controlling, when running on a computer, operation of a vacuum waste collection system having a transport pipe system for transport of waste to a central waste collection point, the transport pipe system including a transport pipe having a number of branches and associated intersections, each branch having an air inlet valve at an end of the branch, the computer program product comprising:

program means for successively selecting a number of branches in a sequence for emptying waste into the transport pipe system and transporting waste towards the central waste collection point, wherein the intersection of each next branch in the sequence is at the same or shorter transport distance to the central waste collection point compared to the intersection of a previous branch in the sequence; and program means for controlling the air inlet valves of the selected branches to enable collective transport of accumulated waste towards the central waste collection point, and for determining when to change to a next branch based on input data from detector means in the transport pipe system, and for performing a controlled change to a next branch when it is detected that waste has been transported past an intersection to a next branch.

22. A control system configured to control operation of a vacuum waste collection system having a transport pipe system for transport of waste to a central waste collection point, the transport pipe system including a transport pipe having a number of branches and associated intersections, each branch having an air inlet valve at an end of the branch;

wherein the control system is configured to successively select a number of branches in a sequence for emptying waste into the transport pipe system and transporting waste towards the central waste collection point, wherein the intersection of each next branch in the sequence is at the same or shorter transport distance to the central waste collection point compared to the intersection of a previous branch in the sequence; and wherein the control system is configured to control the air inlet valves of the selected branches to enable collective transport of accumulated waste towards the central waste collection point, and to determine when to change to a next branch and perform a controlled change to a next branch when it is determined that waste has been transported past an intersection to a next branch.

\* \* \* \* \*